United States Patent
Hsia

(10) Patent No.: US 10,602,597 B1
(45) Date of Patent: Mar. 24, 2020

(54) SOLID-STATE LIGHTING WITH A REDUCED TEMPORAL LIGHT ARTIFACT

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 16/694,970

(22) Filed: Nov. 25, 2019

Related U.S. Application Data

(63) Continuation-in-part of application No. 16/681,740, filed on Nov. 12, 2019, which is a continuation-in-part of application No. 16/664,034, filed on Oct. 25, 2019, which is a continuation-in-part of application No. 16/572,040, filed on Sep. 16, 2019, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No.
(Continued)

(51) Int. Cl.
| | |
|---|---|
| *H05B 45/37* | (2020.01) |
| *F21V 23/02* | (2006.01) |
| *H02M 1/44* | (2007.01) |
| *H02M 1/42* | (2007.01) |
| *H02M 1/08* | (2006.01) |
| *F21Y 115/10* | (2016.01) |

(52) U.S. Cl.
CPC ............. *H05B 45/37* (2020.01); *F21V 23/02* (2013.01); *H02M 1/08* (2013.01); *H02M 1/4258* (2013.01); *H02M 1/44* (2013.01); *F21Y 2115/10* (2016.08)

(58) Field of Classification Search
CPC ........ H05B 45/00; H05B 45/33; H05B 45/34; H05B 45/345; H05B 45/35; H05B 45/355; H05B 45/357; H05B 45/36; H05B 45/37; H05B 45/3725; H05B 45/385; H05B 45/52; H05B 45/54; H05B 47/00; H05B 47/10; H05B 47/14; H05B 47/155; H02M 1/08; H02M 1/4258; H02M 1/44; F21V 23/02; F21Y 2115/10
See application file for complete search history.

(56) References Cited

U.S. PATENT DOCUMENTS

2012/0081032 A1* 4/2012 Huang ................... H05B 45/37
315/294

* cited by examiner

*Primary Examiner* — Jimmy T Vu
(74) *Attorney, Agent, or Firm* — Han IP PLLC; Andy M. Han

(57) ABSTRACT

An LED luminaire comprising LED arrays, a full-wave rectifier coupled to AC mains, a power switching converter, and an LED driving circuit coupled to the power switching converter is used to replace a conventional luminaire with a severe temporal light artifact. The power switching converter is configured to convert a first DC voltage from the full-wave rectifier into a second DC voltage with a low-frequency ripple associated with the AC mains. By adapting switching frequencies to compensate the low-frequency ripple of the second DC voltage, the LED driving circuit can regulate the second DC voltage into a third DC voltage with a ripple-reduced LED driving current to drive the LED arrays with a flicker-reduced light emission to protect users of the LED luminaire from possible health hazards such as seizures, headaches, eyestrain, reduced visual performance, migraines, etc.

11 Claims, 6 Drawing Sheets

Related U.S. Application Data

16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

SOLID-STATE LIGHTING WITH A REDUCED TEMPORAL LIGHT ARTIFACT

CROSS-REFERENCE TO RELATED APPLICATIONS

The present disclosure is part of a continuation-in-part (CIP) application of U.S. patent application Ser. No. 16/681,740, filed 12 Nov. 2019, which is part of CIP application of U.S. patent application Ser. No. 16/664,034, filed 25 Oct. 2019, which is part of CIP application of U.S. patent application Ser. No. 16/572,040, filed 16 Sep. 2019, which is part of CIP application of U.S. patent application Ser. No. 16/547,502, filed 21 Aug. 2019, which is part of CIP application of U.S. patent application Ser. No. 16/530,747, filed 2 Aug. 2019, which is part of CIP application of U.S. patent application Ser. No. 16/458,823, filed 1 Jul. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaires and more particularly to an LED luminaire that includes an LED driving circuit regulated to suppress a temporal light artifact which may possibly impact users' health.

Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential health concerns such as temporal light artifacts become especially important and need to be well addressed.

In today's retrofit application of an LED luminaire to replace an existing fluorescent luminaire, consumers may choose either to adopt a ballast-compatible luminaire with an existing ballast used to operate the fluorescent luminaire or to employ an alternate current (AC) mains-operable LED luminaire by removing/bypassing the ballast. Either application has its advantages and disadvantages. In the former case, although the ballast consumes extra power, it is straightforward to replace the fluorescent luminaire without rewiring, which consumers have a first impression that it is the best alternative to the fluorescent luminaire. But the fact is that total cost of ownership for this approach is high regardless of very low initial cost. For example, the ballast-compatible luminaire works only with particular types of ballasts. If an existing ballast is not compatible with the ballast-compatible luminaire, the consumer will have to replace the ballast. Some facilities built long time ago incorporate different types of fixtures, which requires extensive labor for both identifying ballasts and replacing incompatible ones. Moreover, a ballast-compatible luminaire can operate longer than the ballast. When an old ballast fails, a new ballast will be needed to replace in order to keep the ballast-compatible luminaire working. Maintenance will be complicated, sometimes for the luminaires and sometimes for the ballasts. The incurred cost will preponderate over the initial cost savings by changeover to the ballast-compatible luminaire for hundreds of fixtures throughout a facility. When the ballast in a fixture dies, all the ballast-compatible luminaires in the fixture go out until the ballast is replaced. In addition, replacing a failed ballast requires a certified electrician. The labor costs and long-term maintenance costs will be unacceptable to end users. From energy saving point of view, the ballast constantly draws power, even when the ballast-compatible luminaires are dead or not installed. In this sense, any energy saved while using the ballast-compatible luminaire becomes meaningless with the constant energy use by the ballast. In the long run, the ballast-compatible luminaires are more expensive and less efficient than self-sustaining AC mains-operable luminaires.

On the contrary, an AC mains-operable luminaire does not require the ballast to operate. Before use of the AC mains-operable luminaire, the ballast in a fixture must be removed or bypassed. Removing or bypassing the ballast does not require an electrician and can be replaced by end users. Each AC mains-operable luminaire is self-sustaining. If one AC mains-operable luminaire in a fixture goes out, other luminaires or lamps in the fixture are not affected. Once installed, the AC mains-operable luminaire will only need to be replaced after 50,000 hours.

According to CIE 17.443 e-ILV, the temporal light artifact (TLA) is an undesired change in visual perception induced by a light stimulus whose luminance or spectral distribution fluctuates with time. A flicker, one of TLA, is a perception of visual unsteadiness for a static observer in a static environment. Furthermore, according to IEEE 1789-2015, flickers are variations in luminance over time (temporal modulation of light). The health impacts of flicker in LED lighting to consumers have seldom been discussed. Occasionally, when some conventional luminaires or lamps fail resulting in flicker, concurrently introducing seizures in the small percentage of the population that suffers from photo-sensitive epilepsy. Magnetically ballasted fluorescent lamps or luminaires have flicker issues identified to be related to migraines, headaches, reduced visual performance and comfort, and other possible neurological health issues. When high frequency electronic ballasts became popular, the flicker issues of fluorescent lamps or luminaires diminish. However, flicker component for such fluorescent lamps or luminaires is between 20% to 25%. For an incandescent lamp and a halogen lamp, the flicker frequency is 120 Hz, and the flicker component is between 15% up to 25%. Compact fluorescent lamps, as energy-saving lamps, have a flicker frequency in a range of 20 kHz to 150 kHz due to a built-in electronic power supply. The flicker component is between 20% to 40%. Since the brightness of LEDs responds instantaneously to an operating current, the flicker frequency and the flicker component depend on a driving current of a power supply used. The flicker component may be between 0% to 100%. The flicker frequency may be from 60 Hz to several hundred kHz, depending on a switching frequency of the power supply used to drive the LEDs. That is, for LED luminaires or lamps, the flicker is primarily determined by the power supply, and some possible health risks are associated with low-frequency modulation of the LEDs. In this case, an LED driving circuit in the power supply must be designed to modulate LED driving current at benign frequencies and to suppress the low-frequency flicker component in order to help protect against the health risks.

SUMMARY

An LED luminaire comprising one or more LED arrays, at least one full-wave rectifier, at least one input filter coupled to the at least one full-wave rectifier, a power switching converter, and an LED driving circuit is used to replace a conventional luminaire with a severe temporal light artifact. The at least one full-wave rectifier is coupled to alternate-current (AC) mains and configured to convert a line voltage from the AC mains into a first direct-current (DC) voltage. The at least one input filter is configured to suppress an electromagnetic interference (EMI) noise.

The power switching converter comprises a first control device configured to improve a power factor, a transformer comprising a primary winding and a secondary winding, a first ground reference, a second ground reference electrically isolated from the first ground reference, a first electronic switch controlled by the first control device, a first at least one current sensing resistor coupled between the first electronic switch and the first ground reference, and at least one rectifier circuit coupled to the secondary winding. The power switching converter is coupled to the at least one full-wave rectifier via the at least one input filter and configured to convert the first DC voltage into a second DC voltage via the transformer and the at least one rectifier circuit. The second DC voltage comprises a low-frequency voltage ripple associated with the AC mains. In this case, the frequency of the low-frequency voltage ripple is referred to 100 Hz or 120 Hz, twice the frequency of the AC mains. A voltage ripple component may be greater than 50%.

The LED driving circuit comprises a second control device, a second at least one current sensing resistor, and a Buck converter in communicating with the second control device. The Buck converter comprises a second electronic switch, an inductor with current charging and discharging controlled by the second electronic switch, a first diode coupled between the second electronic switch and the second ground reference, and an output capacitor coupled between the inductor and the second ground reference. The second at least one current sensing resistor is coupled between the second electronic switch and the second control device. The LED driving circuit is coupled to the at least one rectifier circuit and configured to convert the second DC voltage into a third DC voltage with an LED driving current to drive the one or more LED arrays with a flicker-reduced light emission.

The LED driving circuit further comprises a second resistor and a common-mode choke. The second resistor is coupled to the one or more LED arrays whereas the common-mode choke is coupled between the second resistor and the output capacitor and configured to reduce a differential interference but to allow the LED driving current to pass and to operate the one or more LED arrays with a flicker-reduced light emission. The second control device is configured to detect zero current in the inductor, to generate a zero current detection signal and to control the second electronic switch on and off with a constant on-time and a varied off-time controlled by the zero current detection signal. By adapting a switching frequency to compensate the low-frequency ripple of the second DC voltage, the LED driving circuit can provide a constant output LED current required to operate the one or more LED arrays with a luminous flux that has a suppressed flicker no matter how severe the low-frequency voltage ripple the power switching converter passes on is. That is, the LED driving circuit produces the third DC voltage with a ripple-reduced LED driving current to drive the one or more LED arrays.

BRIEF DESCRIPTION OF THE DRAWINGS

Non-limiting and non-exhaustive embodiments of the present disclosure are described with reference to the following figures, wherein like names refer to like parts but their reference numerals differ throughout the various figures unless otherwise specified. Moreover, in the section of detailed description of the invention, any of a "primary", a "secondary", a "first", a "second", a "third", and so forth does not necessarily represent a part that is mentioned in an ordinal manner, but a particular one.

DETAILED DESCRIPTION OF VARIOUS EMBODIMENTS

Figure 1:
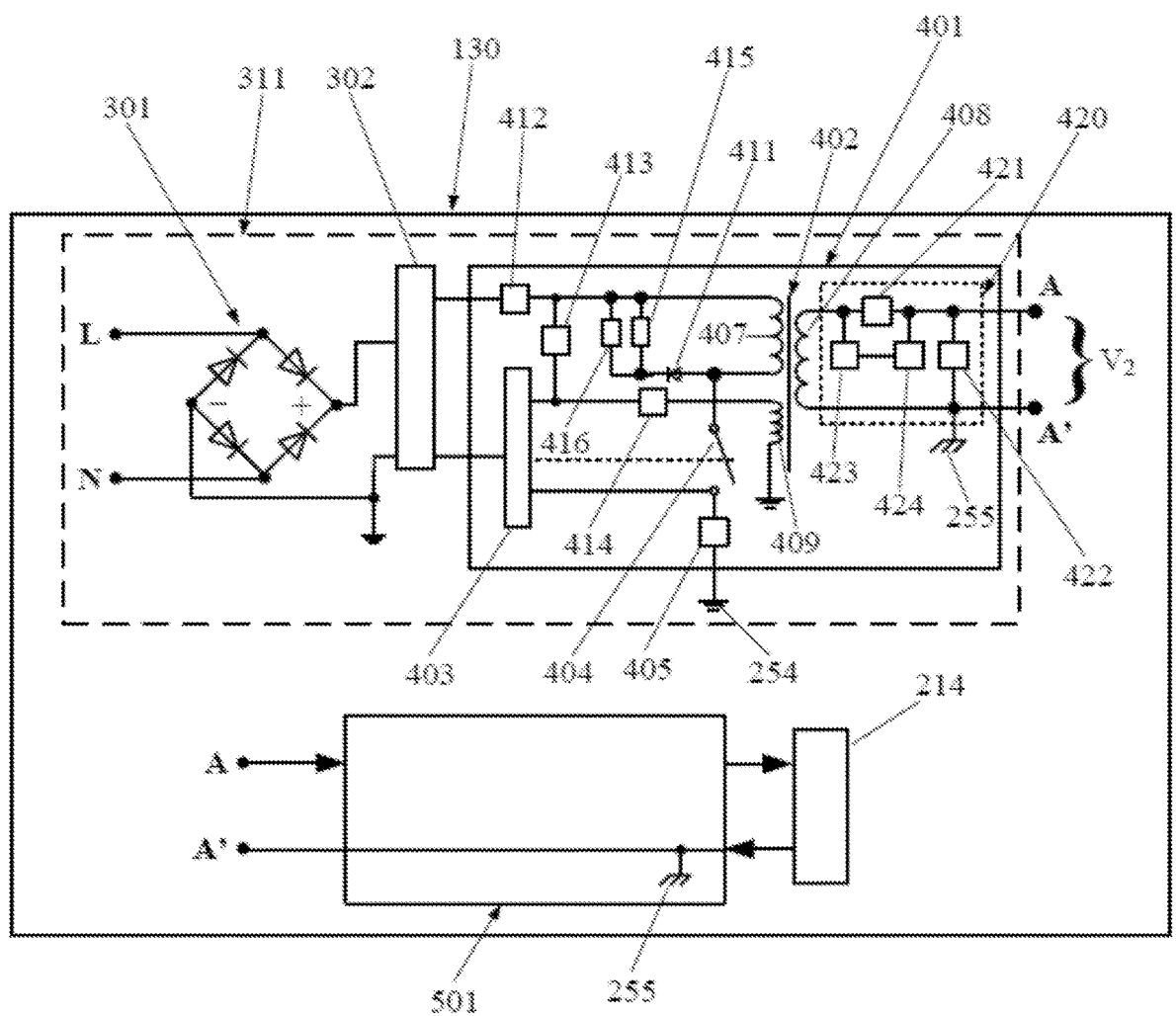
FIG. 1 is a block diagram of an LED luminaire according to the present disclosure.

FIG. 1 is a block diagram of an LED luminaire according to the present disclosure. The LED luminaire 130 comprises one or more LED arrays 214, a power supply unit 311, and an LED driving circuit 501. The power supply unit 311 comprises at least two electrical conductors "L'" and "N", a full-wave rectifier 301, and at least one input filter 302. The at least two electrical conductors "L'" and "N" are configured to couple to the AC mains. The full-wave rectifier 301 is configured to convert a line voltage from the AC mains into a first DC voltage. The at least one input filter 302 is configured to suppress EMI noises. The power supply unit 311 further comprises a power switching converter 401 comprising a transformer 402, a first control device 403 configured to improve a power factor, a first ground reference 254, a second ground reference 255 electrically isolated from the first ground reference 254, a first electronic switch 404 controlled by the first control device 403, a first at least one current sensing resistor 405 coupled between the first electronic switch 404 and the first ground reference 254, and at least one rectifier circuit 420. The transformer 402 comprises a primary winding 407, a secondary winding 408, and an auxiliary winding 409.

In FIG. 1, the power switching converter 401 is coupled to the full-wave rectifier 301 via the at least one input filter 302 and configured to convert the first DC voltage into a second DC voltage across a capacitor 410 via the transformer 402 and the at least one rectifier diode circuit 406 that is coupled to the secondary winding 408. The second DC voltage comprises a low-frequency ripple associated with the AC mains because the line voltage is sinusoidal at a nominal frequency of 50 Hz or 60 Hz.

The power switching converter 401 further comprises a second diode 411, a first startup resistor 412, a second startup resistor 413, a voltage feedback circuit 414, a first resistor 415, and a first capacitor 416 connected in parallel with first resistor 415. The second diode 411 is connected in series with both the first resistor 415 and the first capacitor 416. The first resistor 415, the first capacitor 416, and the second diode 411 are further coupled to the primary winding 407 and configured to reset the transformer 402, helping to reduce a power loss. The primary winding 407 is coupled to the at least one input filter 302 via the first startup resistor 412, the second diode 411, the first resistor 415, and the first capacitor 416. The primary winding 408 is also coupled to the first electronic switch 404, When the first electronic switch 404 is turned on by the first control device 403, a DC current enters the primary winding 407 to charge thereof. The second diode 411 does not conduct because of a reverse bias. When the first electronic switch 404 is turned off, the primary winding 407 reverses its polarity leading to a forward bias for the second diode 411 to conduct and to loop a current path for energy stored in the primary winding 407 to release, sustaining an inductor current that can transfer to the secondary winding 408 and the auxiliary winding 409, respectively building up a secondary voltage and an auxiliary voltage. The voltage feedback circuit 414 comprising a diode is coupled to the auxiliary winding 409 and the first control device 403. The first control device 403 has an input capacitor (not shown) with a startup voltage built up to operate an internal logic control circuit (not shown) in the first control device 403. When the startup voltage decreases due to its increased internal operations and controls, and when the auxiliary voltage is higher than the startup voltage, the diode in the voltage feedback circuit 414 conducts to supply a current to the first control device 403 and sustain its operations. The function of the voltage feedback circuit 414 is essential for the first control device 403 to operate properly because the power switching converter 401 has a wide range of operating voltages, for example, 110, 277, or 347 VAC from the AC mains in North America and because the line voltage from the AC mains goes to zero in each AC cycle. In the first control device 403, the first startup resistor 412 and the second startup resistor 413 are so designed to operate the power switching converter 401 at the lowest input voltage 110 VAC. When the highest voltage 347 VAC comes in, a higher proportional voltage appears at an input of the internal logic control circuit. Therefore, an operating voltage for the internal logic control circuit must be in a wide range such as 11~35 VDC. To meet requirements of startup time and current without turn-on failure or flickering occurred at the lamp start-up, the input capacitor in the first control device 403 with a minimum capacitance is designed and used at the input of the internal logic control circuit. The voltage feedback circuit 414 is thus needed to pump in energy in time and to sustain the operating voltage and to ensure no flickering occurred when the one or more LED arrays 214 is operating. That is, the voltage feedback circuit 414 is configured to extract partial energy from the auxiliary voltage to sustain operation of the first control device 403 whereas the at least one rectifier circuit 420 comprising an electrolytic capacitor 422 is configured to rectify the secondary voltage into the second DC voltage, further filtered and smoothed out by the electrolytic capacitor 422. In FIG. 1, the second DC voltage is outputted via ports A and A', further coupled to the LED driving circuit 501. As seen, the port A' is coupled to the second ground reference 255 and provides a return current path for the one or more LED arrays 214 to operate. The at least one rectifier circuit 420 further comprises a third resistor 423, a second capacitor 424 connected in series with the third resistor 423, and a third diode 421 connected across the third resistor 423 and the second capacitor 424. The third resistor 423 and the second capacitor 424 are configured to improve response time for fast recovery of the third diode 421.

Figure 2:
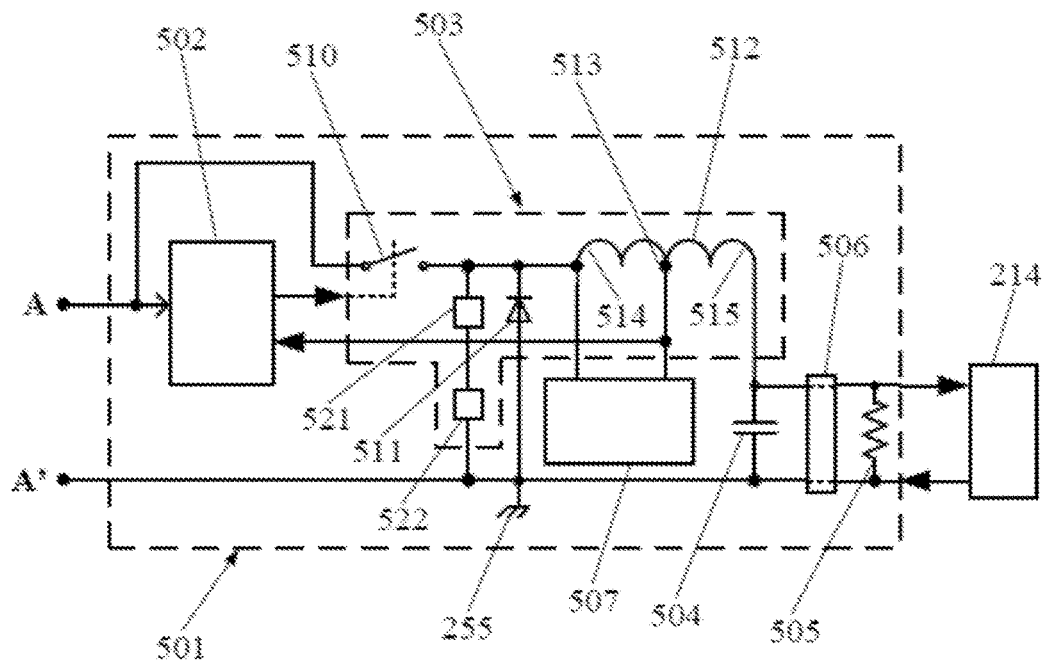
FIG. 2 is a block diagram of an LED driving circuit according to the present disclosure.

FIG. 2 is a block diagram of an LED driving circuit according to the present disclosure. The LED driving circuit 501 comprises a second control device 502, a Buck converter 503 in communicating with the second control device 502, an output capacitor 504, a second resistor 505, a common-mode choke 506 coupled between the output capacitor 504 and the second resistor 505, and a second at least one current sensing resistor 507. The output capacitor 504, the common-mode choke 506, and the second resistor 505 are coupled to the Buck converter 503 and configured to build up an output voltage and to power the one or more LED arrays 214. The common-mode choke is configured to reduce a differential interference but to allow the ripple-reduced LED driving current to pass and to operate the one or more LED arrays 214.

The LED driving circuit 501 is connected to the power switching converter 401 via the port A and A' with the second ground reference 255 connected to the port A'. The Buck converter 503 comprises a second electronic switch 510 controlled by the second control device 502, a first diode 511, and an inductor 512 with its current charging and discharging controlled by the second electronic switch 510. The second control device 502 is configured to detect zero current in the inductor 512, to generate a zero current detection signal, and to control the second electronic switch 510 on and off with a constant on-time and a varied off-time controlled by the zero current detection signal. By adapting a switching frequency to compensate the low-frequency ripple of the second DC voltage so as to produce the third DC voltage with the ripple-reduced LED driving current, the LED driving circuit 501 can provide an output current required to operate the one or more LED arrays 214 with a luminous flux that has a suppressed flicker component no matter how severe the low-frequency voltage ripple in the second DC voltage is. The switching frequency is no less than 30 kHz to ensure a flicker frequency is very far out of low-frequency zone. Please note that the low-frequency flicker may be referred to a nominal flicker frequency of 100 Hz or 120 Hz, depending on a line frequency of the AC mains used. The inductor 512 comprises a center-tapped port 513 configured to divide the inductor 512 into an upper portion 514 and a lower portion 515. The upper portion 514 is configured to connect in parallel with the second at least one current sensing resistor 507. The center-tapped port 513 is further configured to feedback both the third DC voltage and a voltage across the lower portion 515 to the second control device 502 to turn the second electronic switch 510 on and off. An average inductor current yields to the LED driving current with a reduced low-frequency current ripple. The LED driving circuit 501 may further comprise a fourth resistor 521 and a third capacitor 522 connected in series with the fourth resistor 521. The fourth resistor 521 and the third capacitor 522 are connected in parallel with the first diode 511. The fourth resistor 521 and the third capacitor 522 are configured to improve response time for fast recovery of the first diode 511.

In FIG. 2, the second control device 502 is configured to control the second electronic switch 510 on and off in a way that the inductor 512 is charged during on-time and discharged during off-time, and that a desired output voltage $V_o$ across the one or more LED arrays 214 is reached to light up the one or more LED arrays 214. In other words, the second electronic switch 510 is turned on and off with a constant on-time and a varied off-time with a duty cycle controlling the third DC voltage and the LED driving current to drive the one or more LED arrays 214. An average inductor current is thus equal to the output current that flows into the one or more LED array 214. When the second electronic switch 510 is on, the first diode 511 is reverse-biased, and an input current flows from the port A and the second electronic switch 510 into the inductor 512. When the input current flowing into the inductor 512 increases, the voltage across the at least one current sensing resistor 507 increases. The at least one current sensing resistor 507 connects to the control device 502, which continuously receives signals from the at least one current sensing resistor 507 and adjusts the off-time such that the desired output voltage $V_o$ and the output current to the one or more LED arrays 214 are regulated to meet the output requirements. The output capacitor 504, the resistor 505 and the common-mode choke 506 is coupled to the inductor 512, receiving energy to build up the desired output voltage $V_o$ to power the one or more LED arrays 214. Output current regulation leads to an effective reduction of flicker of light emission from the one or more LED arrays 214.

In FIG. 2, when the input current goes into the inductor 512, energy is stored in it. When the second electronic switch 510 is off, the first diode 511 is forward-biased, and the inductor 512 releases the energy stored, resulting in a loop current flowing from the inductor 512, the one or more LED arrays 214, and the first diode 511, back to the inductor 512, completing the energy transfer to the one or more LED arrays 214. When the second electronic switch 510 is on, the input current flows from the second electronic switch 510 and the inductor 512 into the one or more LED arrays 214. At the same time, part of the input current flows into the at least one current sensing resistor 507, creating a sensing voltage across the at least one current sensing resistor 507. The sensing voltage goes to the control device 502 to control the off-time of the second electronic switch 510. When the second electronic switch 510 is off, the first diode 511 is forward-biased, and the inductor 512 discharges with a loop current flowing from the inductor 512, the one or more LED arrays 214, and the first diode 511, back to the inductor 512. The at least one current sensing resistor 507 keeps track of the output current and feedbacks to the control device 502 to further control the second electronic switch 510 on and off. The closed loop operation in both on-time and off-time of the second electronic switch 510 ensures the output current to be accurately controlled within 4%.

Figure 3:
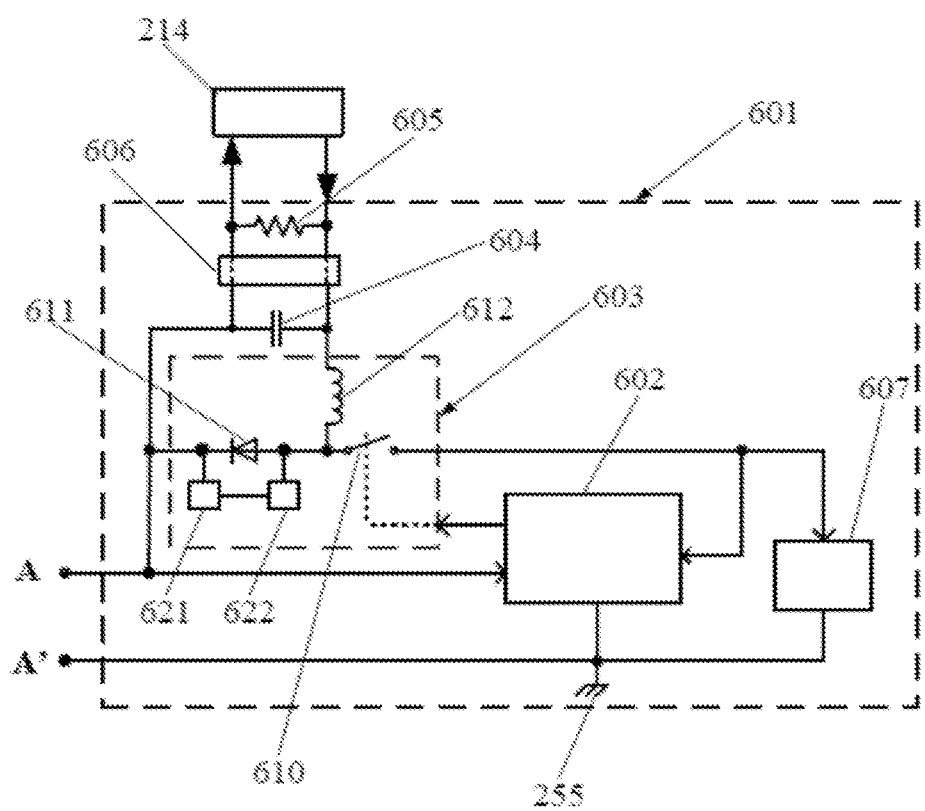
FIG. 3 is a block diagram of another embodiment of the LED driving circuit according to the present disclosure.

FIG. 3 is a block diagram of another embodiment of an LED driving circuit according to the present disclosure. FIG. 3 has all the components as in FIG. 2, but interconnections are different. In FIG. 3, the LED driving circuit 601 comprises a second control device 602, a Buck converter 603 in communicating with the second control device 602, an output capacitor 604, a second resistor 605, a common-mode choke 606 coupled between the output capacitor 604 and the second resistor 605, and a second at least one current sensing resistor 607. The output capacitor 604, the common-mode choke 606, and the second resistor 605 are coupled to the Buck converter 603 and configured to build up an output voltage and to power the one or more LED arrays 214. The LED driving circuit 601 is connected to the power switching converter 401 via the port A and A' with the second ground reference 255 connected to the port A'. The Buck converter 603 comprises a second electronic switch 610 controlled by the second control device 602, a first diode 611, and an inductor 612 with its current charging and discharging controlled by the second electronic switch 610. The second control device 602 is configured to detect zero current in the inductor 612, to generate a zero current detection signal, and to control the second electronic switch 610 on and off with a constant on-time and a varied off-time controlled by the zero current detection signal. By adapting a switching frequency to compensate the low-frequency ripple of the second DC voltage so as to produce the third DC voltage with the ripple-reduced LED driving current, the LED driving circuit 601 can provide an output current required to operate the one or more LED arrays 214 with a luminous flux that has a suppressed flicker component no matter how severe the low-frequency ripple in the second DC voltage is. The at least one current sensing resistor 607 is configured to couple to the second electronic switch 610 and the second control device 602, to extract a voltage across the at least one current sensing resistor 607, and to feedback to the second control device 602 to control the second electronic switch 610 on and off. An average inductor current becomes the LED driving current with a reduced low-frequency current ripple.

The second control device 602 is configured to control the second electronic switch 610 on and off in a way that the inductor 612 is charged during on-time and discharged during off-time, and that a desired output voltage $V_o$ across the one or more LED arrays 214 is reached to light up the one or more LED arrays 214. The average inductor current is thus equal to the output current that flows into the one or more LED array 214. When the second electronic switch 610 is on, the first diode 611 is reverse-biased, and an input current flows from the port A, the one or more LED arrays 214, the inductor 612, to the second electronic switch 610, all the way to the at least one current sensing resistor 607. When the input current flowing into the inductor 612 increases, the voltage across the at least one current sensing resistor 607 increases. The at least one current sensing resistor 607 connects to the second control device 602, which continuously receives signals from the at least one current sensing resistor 607 and adjusts the off-time such that the desired output voltage $V_o$ and the output current to the one or more LED arrays 214 are regulated to meet the output requirements. The output capacitor 604, the second resistor 605, and the common-mode choke 606 is coupled to the inductor 612, receiving energy to build up the desired output voltage $V_o$ to power the one or more LED arrays 214. Output current regulation leads to an effective reduction of flicker of light emission from the one or more LED arrays 214.

In FIG. 3, when the input current goes into the inductor 612, energy is stored in it. When the second electronic switch 610 is off, the first diode 611 is forward-biased, and the inductor 612 releases the energy stored, resulting in a loop current flowing from the first diode 611 and the one or more LED arrays 214, back to the inductor 612, completing the energy transfer to the one or more LED arrays 214. When the second electronic switch 610 is on, the input current flows into the one or more LED arrays 214, the inductor 612, the second electronic switch 610, and the at least one current sensing resistor 607, creating a sensing voltage across the at least one current sensing resistor 607. The sensing voltage goes to the second control device 602 to control the off-time of the second electronic switch 610. When the second electronic switch 610 is off, the first diode 611 is forward-biased, and the inductor 612 discharges with a loop current flowing from the one or more LED arrays 214, the first diode 611, the at least one current sensing resistor 607, back to the inductor 612. The at least one current sensing resistor 607 keeps track of the output current and feedbacks to the second control device 602 to further control the second electronic switch 610 on and off. The closed loop operation in both on-time and off-time of the second electronic switch 610 ensures the output current to be accurately controlled within 4%.

Figure 4:
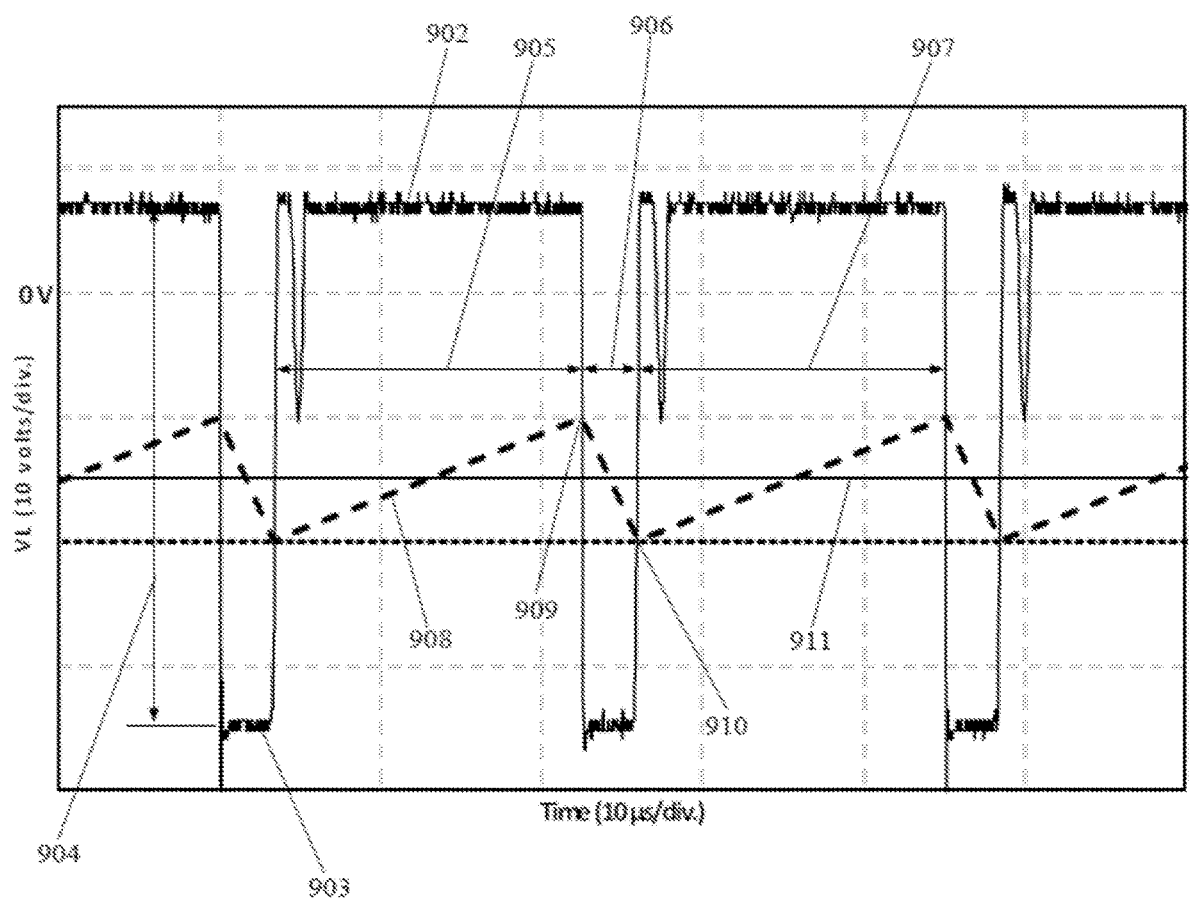
FIG. 4 is a waveform of a switching voltage measured according to the present disclosure.

FIG. 4 is a waveform of a voltage measured across the inductor 512 (FIG. 2) and the second ground reference 255 according to the present disclosure. Referring to FIGS. 1-2, when 120 V/60 Hz of the AC mains is applied, the bridge rectifier 301 outputs the first DC voltage of 158 V (peak value) with a ripple cycle of 8.33 milliseconds (ms), equivalent to a frequency of 120 Hz, twice the frequency of the AC mains to operate the power switching converter 401. The power switching converter 401 then converts the first DC voltage into the second DC voltage, which is lower than the first DC voltage. However, the second DC voltage comprises a low-frequency ripple component attributed to the AC mains. The LED driving circuit 501 then converts the second DC voltage into the third DC voltage, which is lower than the second DC voltage. Referring to FIGS. 1, 2, and 4, the inductor 512 is charged when the second electronic switch 510 is on. The high level 902 represents $V_{DC,2}-V_o$, where $V_{DC,2}$ is an output voltage from the second electronic switch 510, and $V_o$ is the desired voltage across the one or more LED arrays 214. The low level 903 represents $-V_o$. The peak-to-peak voltage 904 between the high level 902 and the low level 903 is basically the second DC voltage. The waveform in FIG. 4 comprises multiple main pulses with a first width 905 of 19 microseconds (μs), a second width 906 of 3.8 μs, and a third width 907 of 19 μs. The first width 905 and the third width 907 represent the constant on-time. The second width 906 then represents the varied off-time. The inductor 512 (in FIG. 2) is discharged when the second electronic switch 510 is off. As seen in FIG. 4, the inductor current 908 increases linearly with the on-time from the zero current when charged, reaching the maximum inductor current ($I_{pk}$) at the end of the on-time 909, then starting to discharge from the maximum inductor current ($I_{pk}$) during off-time. At the end of discharge cycle 910, the inductor current 908 decreases to zero, and the second control device 502 detects the zero current and turns on the second electronic switch 510 for a next charging cycle. An average inductor current 911 then represents a desired output current to operate the LED arrays 214. For the $V_{DC}$ of 158 V rectified from the line voltage 120 V of the AC mains to enter the power supply unit 311, the on-time is fixed at 19 μs, whereas the off-time of the second electronic switch 510 varies as determined by the zero inductor current. In FIG. 4, the off-time period 906 of 3.8 μs appears between the first width 905 and the third width 907. Thus, a corresponding switching frequency is 44.3 kHz. This means that hundreds of inductor charging cycles are used for each half cycle of the line voltage of 120 V from the AC mains. However, the switching frequency may slightly vary from 44.3 kHz because the off-time varies according to variations of the second DC voltage further due to line voltage variations. In FIG. 4, a duty cycle of 0.833 gives a desired output voltage $V_o$ with a constant output current, yielding a regulated power to operate the one or more LED arrays 214 when the LED driving circuit 501 is operating. For a 277 VAC/60 Hz input, experimental results are similar to the ones depicted for 110 VAC with the constant on-time and a varied off-time.

Figure 5:
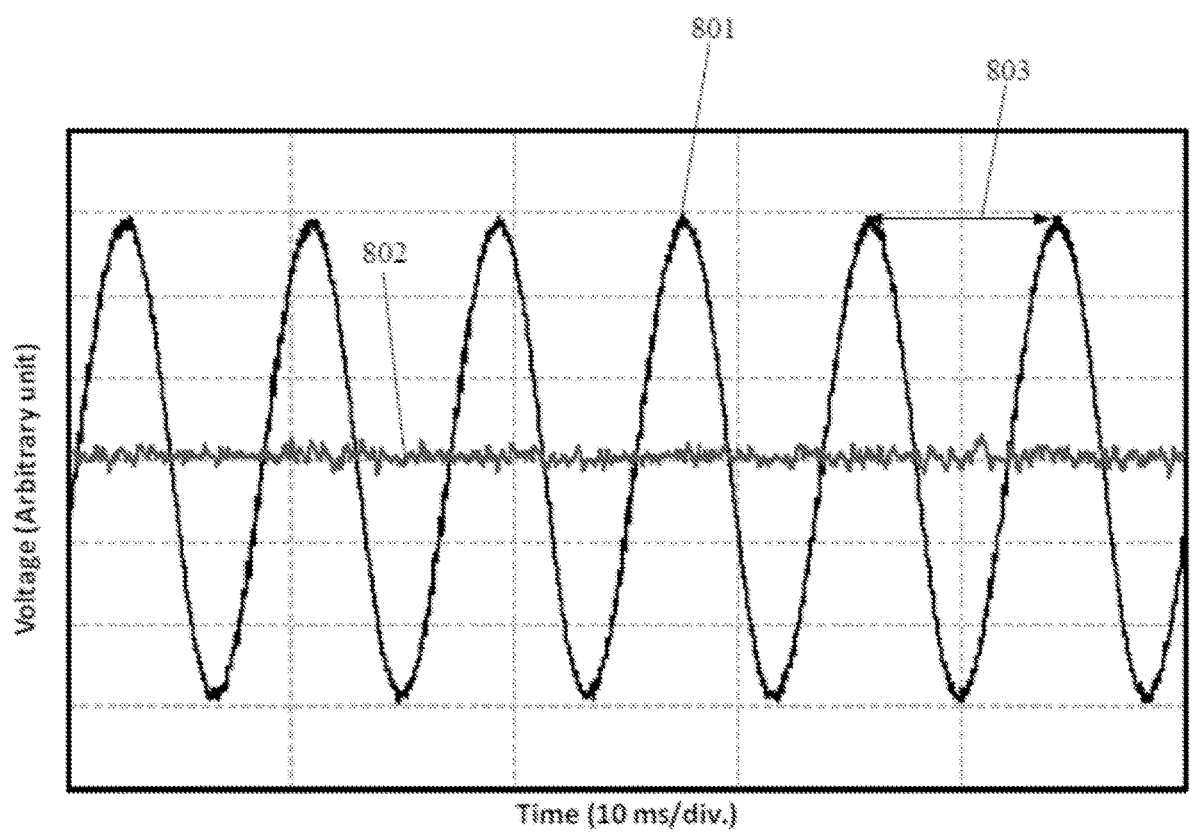
FIG. 5 is low-frequency ripple waveforms of a second DC voltage and a third DC voltage measured according to the present disclosure.

FIG. 5 is low-frequency ripple waveforms of the second DC voltage and the third DC voltage according to the present disclosure. In FIG. 5, a low-frequency voltage ripple waveform 801 of the second DC voltage is compared with a low-frequency voltage ripple waveform 802 of the third DC voltage. The low-frequency voltage ripple waveform 801 comprises a period 803, corresponding to a ripple frequency of 120 Hz. As computed, at least 26 dB voltage ripple reduction for the third DC voltage over the second DC voltage is achieved. In this disclosure, the reduced low-frequency voltage ripple is, therefore, referred to a voltage ripple at least minus 20 dB (−20 dB) relative to a typical low-frequency voltage ripple generated from the power switching converter 401. Since the brightness of the one or more LED arrays responds instantaneously to the LED driving current, the reduced low-frequency current ripple is referred to a current ripple at least minus 20 dB relative to a typical low-frequency current ripple generated from the power switching converter 401.

Figure 6:
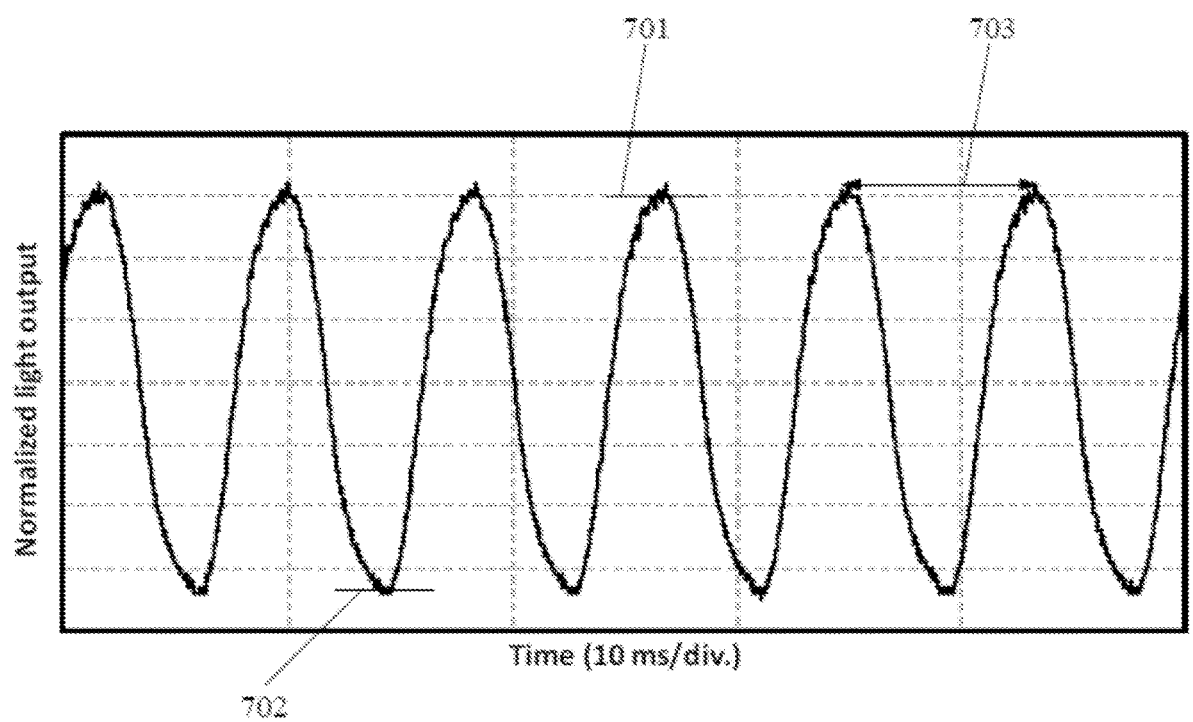
FIG. 6 is an example of a temporal light artifact of a light emission from a conventional LED luminaire according to the present disclosure.

FIG. 6 is an example of a temporal light artifact of a light emission from a conventional LED luminaire according to the present disclosure. In FIG. 6, a luminous output of the light emission from the conventional LED luminaire is sampled and recorded over time. The luminous output is normalized on the vertical axis from "0" to "1" with a maximum 701 corresponding to "1" and a minimum (Min) 702. Therefore, the percent flicker simplifies to 100×(1−Min)/(1+Min), where the minimum 702 is normalized. A waveform period 703 can be measured from a time scale of 10 ms/division. This corresponds to a flicker frequency 120 Hz. A percent flicker is computed to be 87%, much worse than an acceptable standard of 10%. Another TLA factor, flicker index, can also be computed to be 0.77 in reference to a flicker index of 0~1.0 for 1.0 to be the worst flicker index.

Figure 7:
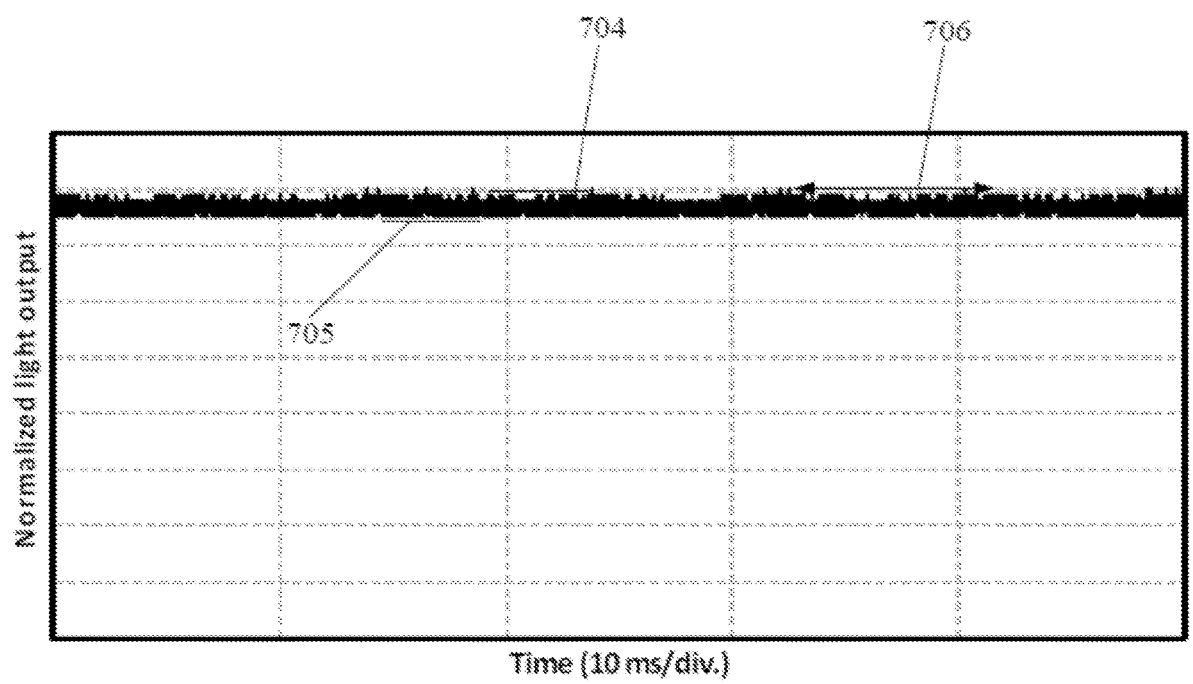
FIG. 7 is an example of a temporal light artifact of a light emission from a proposed LED luminaire according to the present disclosure.

FIG. 7 is an example of a temporal light artifact of a light emission from a proposed LED luminaire according to the present disclosure. The proposed LED luminaire comprises the power switching converter 401 depicted in FIG. 1 and the LED driving circuit 501 depicted in FIG. 2. In FIG. 7, a light output emission from a proposed LED luminaire is sampled and recorded over time with a maximum 704 and a minimum 705. It seems no apparent flicker. However, a computation on the maximum 704 and the minimum 705 shows a percent flicker of 3.23%. A waveform period 706 gives a flicker frequency of 120 Hz. This means that a voltage and current regulation on the LED driving circuit 501 provides a further advantage to suppress the low-frequency flicker by 28.6 dB over a performance of the conventional luminaire depicted in FIG. 6, being substantially consistent with the voltage ripple reduction depicted in FIG. 5.

Whereas preferred embodiments of the present disclosure have been shown and described, it will be realized that alterations, modifications, and improvements may be made thereto without departing from the scope of the following claims. Another LED driving circuit with an output current regulated in an LED-based luminaire using various kinds of combinations to accomplish the same or different objectives could be easily adapted for use from the present disclosure. Accordingly, the foregoing descriptions and attached drawings are by way of example only and are not intended to be limiting.

What is claimed is:

1. A light-emitting diode (LED) luminaire, comprising:
   one or more LED arrays;
   at least one full-wave rectifier configured to couple to alternate-current (AC) mains and convert a line voltage from the AC mains into a first direct-current (DC) voltage;
   at least one input filter coupled to the at least one full-wave rectifier, the at least one input filter configured to suppress an electromagnetic interference (EMI) noise;
   a power switching converter comprising a first control device configured to correct a power factor, a transformer comprising a primary winding and a secondary winding, a first ground reference, a second ground reference electrically isolated from the first ground reference, a first electronic switch controlled by the first control device, a first at least one current sensing resistor coupled between the first electronic switch and the first ground reference, and at least one rectifier circuit coupled to the secondary winding, wherein the power switching converter is coupled to the at least one full-wave rectifier via the at least one input filter and configured to convert the first DC voltage into a second DC voltage via the transformer and the at least one rectifier circuit; and
   an LED driving circuit comprising a second control device, a second electronic switch, an inductor with current charging and discharging controlled by the second electronic switch, a first diode coupled between the second electronic switch and the second ground reference, a second at least one current sensing resistor coupled between the second electronic switch and the second control device, and an output capacitor connected between the inductor and the second ground reference, wherein the LED driving circuit is coupled to the at least one rectifier circuit and configured to convert the second DC voltage into a third DC voltage with an LED driving current to drive the one or more LED arrays with a flicker-reduced light emission,
   wherein:
      the second electronic switch is configured to modulate the second DC voltage at a switching frequency controlled by the second control device; and
      the LED driving circuit is further configured to output a reduced low-frequency current ripple to drive the one or more LED arrays.

2. The LED luminaire of claim 1, wherein the inductor comprises a center-tapped port configured to divide the inductor into an upper portion and a lower portion, wherein the upper portion is configured to connect in parallel with the second at least one current sensing resistor, wherein the center-tapped port is further configured to feedback both the third DC voltage and a voltage across the lower portion to the second control device to turn the second electronic switch on and off, and wherein an average inductor current yields to the LED driving current with the reduced low-frequency current ripple.

3. The LED luminaire of claim 1, wherein the LED driving circuit is further configured to drive the one or more LED arrays with the flicker-reduced light emission with a percent flicker less than 10% at a nominal flicker frequency of 100 Hz or 120 Hz.

4. The LED luminaire of claim 1, wherein, responsive to detecting zero current in the inductor, the second control device is configured to generate a zero current detection signal to control the second electronic switch on and off with a constant on-time and a varied off-time with a duty cycle controlling the third DC voltage and the LED driving current to drive the one or more LED arrays.

5. The LED luminaire of claim 1, wherein the LED driving circuit is further configured to adapt the switching frequency to compensate a low-frequency voltage ripple of the second DC voltage so as to produce the third DC voltage with the ripple-reduced LED driving current to drive the one or more LED arrays.

6. The LED luminaire of claim 5, wherein the switching frequency is no less than 30 kHz.

7. The LED luminaire of claim 1, wherein the power switching converter further comprises a first resistor, a first capacitor connected in parallel with the first resistor, and a second diode connected in series with both the first resistor and the first capacitor, and wherein the first resistor, the first capacitor, and the second diode are further coupled to the primary winding and configured to reset the transformer, thereby helping to reduce a power loss.

8. The LED luminaire of claim 1, wherein the LED driving circuit further comprises a second resistor and a common-mode choke, wherein the second resistor is coupled to the one or more LED arrays, wherein the common-mode choke is coupled between the second resistor and the output capacitor and configured to reduce a differential interference but to allow the LED driving current to pass and to operate the one or more LED arrays with the flicker-reduced light emission.

9. The LED luminaire of claim 1, wherein the at least one rectifier circuit comprises a third resistor, a second capacitor connected in series with the third resistor, and a third diode connected across the third resistor and the second capacitor, and wherein the third resistor and the second capacitor are configured to reduce response time for fast recovery of the third diode.

10. The LED luminaire of claim 1, wherein the LED driving circuit further comprises a fourth resistor and a third capacitor connected in series with the fourth resistor, wherein the fourth resistor and the third capacitor are connected in parallel with the first diode, and wherein the fourth resistor and the third capacitor are configured to reduce response time for fast recovery of the first diode.

11. The LED luminaire of claim 1, wherein the transformer further comprises an auxiliary winding, wherein the power switching converter further comprises a voltage feedback circuit, and wherein the voltage feedback circuit is configured to draw partial energy from the auxiliary winding to sustain operation of the first control device.

* * * * *